United States Patent
Pfitzmann et al.

(10) Patent No.: US 8,205,266 B2
(45) Date of Patent: Jun. 19, 2012

(54) DIGITAL RIGHTS MANAGEMENT

(75) Inventors: Birgit M. Pfitzmann, Wettswil (CH); Michael P. Waidner, Seeheim-Jugenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/597,664

(22) PCT Filed: Jan. 28, 2005

(86) PCT No.: PCT/IB2005/000250
§ 371 (c)(1), (2), (4) Date: Mar. 21, 2008

(87) PCT Pub. No.: WO2005/076104
PCT Pub. Date: Aug. 18, 2005

(65) Prior Publication Data
US 2008/0235805 A1    Sep. 25, 2008

(30) Foreign Application Priority Data
Feb. 3, 2004    (EP) ................................. 04405070

(51) Int. Cl.
*G06F 21/00* (2006.01)
(52) U.S. Cl. .................... 726/27; 380/201; 705/59
(58) Field of Classification Search ............... 705/1, 59; 713/200; 726/20, 27–33; 380/201
See application file for complete search history.

(56) References Cited

U.S. PATENT DOCUMENTS

| | | | |
|---|---|---|---|
| 5,138,712 A * | 8/1992 | Corbin | 726/30 |
| 5,260,999 A * | 11/1993 | Wyman | 705/59 |
| 5,764,887 A * | 6/1998 | Kells et al. | 726/14 |
| 2002/0174356 A1* | 11/2002 | Padole et al. | 713/200 |
| 2002/0194010 A1* | 12/2002 | Bergler et al. | 705/1 |
| 2002/0194475 A1* | 12/2002 | Ishiguro et al. | 713/168 |
| 2003/0084306 A1* | 5/2003 | Abburi et al. | 713/188 |
| 2003/0236975 A1* | 12/2003 | Birk et al. | 713/156 |
| 2005/0114266 A1* | 5/2005 | Satkunanathan et al. | 705/59 |

FOREIGN PATENT DOCUMENTS
EP    1 231 532 A2    8/2002

OTHER PUBLICATIONS

Official Communication from European Patent Office for Application No. 05 702 399.6-2212, pp. 1-5 (Nov. 30, 2006). Examination Report for EPO Patent Application No. 05 702 399.6-2212, pp. 1-8 (Mar. 6, 2009).
Birgit Pfitzmann, Strong Loss Tolerance of Electronic Coin Systems, ACM Transaction on Computer Systems, vol. 15, No. 2, pp. 194-213 (May 1997).

* cited by examiner

*Primary Examiner* — Nasser Goodarzi
*Assistant Examiner* — Ghazal Shehni
(74) *Attorney, Agent, or Firm* — Ido Tuchman; William J. Stock

(57) ABSTRACT

Software license management systems are provided in which a license to use a software product is represented by a data token. The systems have a software controller for controlling use of the software product at a user device, and a license management server for communicating with the software controller via a data communications network. The software controller allows use of the software product at the user device substantially only during a use period associated with a current data token supplied to the software controller by the license management server. An exchange token can be supplied to another, similar software controller when necessary to transfer the license, e.g. in the event of a breakdown. The software controller is adapted to supply either the current data token, or the exchange token, to the license management server to be exchanged for a new data token.

31 Claims, 4 Drawing Sheets

DIGITAL RIGHTS MANAGEMENT

CROSS-REFERENCE TO RELATED APPLICATIONS

This application claims priority under 35 U.S.C. §119 to European Patent Application No. 04405070.6 filed Feb. 3, 2003, and Patent Cooperation Treat Application No. PCT/IB2005/000250 filed Jan. 28, 2005, the entire text of which are specifically incorporated by reference herein.

FIELD OF THE INVENTION

This invention relates generally to digital rights management. Digital rights management is concerned with the managing of software licences with a view to ensuring that licences are not infringed. Licences can be enforced by providing a mechanism to control the use of licensed software products at user devices so as to inhibit use in violation of the licence. Embodiments of the present invention provide methods and apparatus for use in software licence management systems involving such control of the use of software products at user devices.

BACKGROUND OF THE INVENTION

Licences for software products (such as programs, audio files, video files, etc.) are commonly restricted to use of a single instance of the software product. That is, the licensed product cannot be used legitimately by more than one user, or, more precisely, on more than one user device (such as a PC, DVD player, etc.), at the same time. The standard approach to enforcing such limited-use licences is to bind the licence to a specific user device. This can be done by encoding a unique device identifier, such as a processor id, the id of a security chip, or a combination of certain configuration details, into the licence, and ensuring that the user device has the correct device identifier before the licensed software is run. For example, a usage program such as a media player may check that it is running on a device with the correct identifier before running a licensed audio or video file.

Binding a software licence to a specific user device has the drawback that if the device fails the licence cannot be exercised anymore. That is, this approach does not ensure availability of the licence to the user. This availability problem is currently addressed in one of two ways, both of which present new problems which make them undesirable for most applications. The first approach is to bind the licence to more than one user device at the outset, so that, if a current device fails, the licence can still be exercised by another device. However, technically nothing then prevents the user from exercising the licence on all of the devices concurrently, thus violating the licence. Moreover, not all users will have more than one device available for this purpose at the time the licence is acquired. The second approach is to entitle the user to a new licence for a new device if he can prove that the old device has failed, or that the identity of the old device has changed. This typically involves the user submitting the old device to the licensor for inspection purposes. Not only does this approach involve considerable inconvenience to the user, but it creates a significant privacy problem in that information about the user, and potentially data stored on the user device, is made accessible to the licensor.

A different type of licensing scheme in which software licences can be exercised on more than one user device is that of "floating licences". Here, licences are bound to a certain group of users (e.g. of a company), and the scheme provides that, at any time, up to a specified plurality of licences for a software product can be actively used. The specified limit on the number of concurrently-used licences is typically controlled by a central licensing server for the user group. To run the software product, a user device contacts the licensing server and asks for a temporary licence which it receives if one is available (i.e. if less than the limiting number of licences are currently in use). The licence is then typically returned to the licensing server on termination of use. The licences are temporary in that there is a certain validity time, or use period, associated with a licence. Thus limited off-line use is allowed, but when the use period expires a new licence must be acquired to continue running the software product. While this scheme provides for transferability of licences between different user devices, it is designed for controlling multiple-instance use of a software product within a trusted environment such as a company network. It does not address the issues, touched on above, presented by licences for single-instance use in a more general environment.

SUMMARY OF THE INVENTION

A first aspect of the present invention provides a software licence management system in which a licence to use a software product is represented by a data token. The system comprises: a software controller for controlling use of a software product at a user device; and a licence management server for communicating with the software controller via a data communications network. The software controller is adapted for:
   allowing said use of the software product substantially only during a use period associated with a current data token supplied to the software controller by the licence management server;
   enabling user access to an exchange token, dependent on the current data token supplied by the licence management server, whereby the exchange token can be supplied as a current data token to another said software controller; and
   supplying one of the current data token and the exchange token via the network to the licence management server to be exchanged for a new data token to replace the current data token (a) to extend the licence for the software product beyond the use period associated with a current data token supplied by the licence management server and (b) if the current data token is an exchange token from another said software controller.

In addition, the licence management server is adapted for:
   supplying via the network to the software controller a new data token, to replace the current data token and having a new use period associated therewith, in exchange for a current data token, or an exchange token corresponding to the current data token, received from the software controller; and
   detecting if a said token received from the software controller for exchange corresponds to a token already exchanged by the licence management server.

Thus, in systems embodying the present invention, the software controller controls use of a software product at a user device in accordance with a current data token, representing a licence for the software product, supplied by the licence management server. Specifically, the data token has an associated use period, and the software controller allows use of the software product substantially only during the use period. However, when necessary to extend the licence beyond the use period of the current token (circumstance (a) above), the software controller can supply the current token (or an exchange token which is dependent on the current token) to the licence management server to be exchanged for a new data token. The new data token returned by the licence management server has a new use period. Since the new data token is then the current token held by the software controller, the software controller allows use of the software product during this new use period. By exchanging tokens in this way the licence can be continually extended, allowing continued use of the software product in normal operation. However, to ensure availability of the licence to the user in the event of a failure at the user device, the software controller enables the user to access the aforementioned exchange token. This exchange token can therefore be transferred to another, similar software controller, e.g. for a new user device, and exchanged for a new data token as described above. This protects the legitimate user against loss of the licence due to a device failure, but three features of the system work together to protect against fraudulent attempts to abuse the licence. In particular, these features frustrate attempts to use the exchange token on one or more additional devices while use continues on the original device. The three features are explained in turn in the following.

Firstly, while the software controller will allow use of the software product, as described above, when the current data token has been supplied by the licence management server, this is not the case if the current data token is an exchange token (as occurs when an exchange token, obtained from a first software controller is supplied to another software controller). In this case, i.e. if the current data token is an exchange token (circumstance (b) above), the software controller will supply the exchange token to the licence management server for exchange. In effect therefore, an exchange token can be exchanged but not used.

Secondly, the licence management server can detect if a token received from a software controller for exchange corresponds to a token already exchanged by the licence management server (i.e. if the received token is the same as one already exchanged, or is the exchange token corresponding to a data token already exchanged or vice versa). Thus, if an exchange token obtained from one software controller is supplied to a second software controller, the second software controller can exchange it for a new data token and thus continue use of the software product, but if the first software controller then attempts to obtain a new data token using the same exchange token (or the corresponding current data token) then this will be detected by the licence management server.

Thirdly, if an exchange token from a first software controller has been copied to a second software controller and exchanged for a new data token, then the use period associated with the original data token corresponding to the exchange token ensures that, even if this use period has not yet expired, continued use of the software product by the first software controller is only of limited duration. When it becomes necessary to extend the licence beyond the use period, an attempt to obtain a new data token by the first software controller will be detected by the licence management server due to the second feature explained above. Thus, even when the use periods of the original and new data tokens overlap, the opportunity for fraudulent concurrent use is only limited. Moreover, preferred features described below allow the potential concurrent use period to be eliminated or minimized as desired.

Since the exchange token is dependent on the current data token, the software controller enables access to the new exchange token each time a new current token is obtained from the licence management server. In general, the exchange token may depend in various ways on the current data token as discussed further below. However, in particular preferred embodiments, the exchange token is simply a copy of the current data token. Since the current data token and exchange token are then identical, the current data token is always supplied to the licence management server in the exchange process and the licence management server can detect double-exchange attempts by detecting if the same data token is received twice for exchange.

A second aspect of the present invention again provides a software licence management system in which a licence to use a software product is represented by a data token, the system comprising: a software controller for controlling use of a software product at a user device; and a licence management server for communicating with the software controller via a data communications network. Here, however, the software controller is adapted for:

allowing said use of the software product substantially only during a use period associated with a current data token supplied to the software controller by the licence management server;

receiving an exchange token associated with said licence, and supplying one of the current data token and the exchange token via the network to the licence management server to be exchanged for a new data token (a) to extend the licence for the software product beyond the use period associated with a current data token supplied by the licence management server and (b) if a said exchange token is received by the software controller in the absence of a current data token.

The licence management server here is adapted for storing the use period for each data token supplied to the software controller under the licence, and supplying via the network to the software controller a new data token in exchange for a current data token, or said exchange token, received from the software controller, the new data token having a new use period which does not overlap the use period of a data token previously-supplied under the licence.

In embodiments of this aspect of the invention therefore, the exchange token does not depend specifically on the current data token as in embodiments of the first aspect of the invention, but is simply associated with the licence under which data tokens are issued by the licence management server. For example, the exchange token here could simply be a fixed representation of the licence such as, effectively, "You are allowed to use software product X with licence number Y", or other arbitrary form of the licence, which the user knows and can supply to any software controller. Thus, the software controller in these embodiments need not necessarily enable user access to the exchange token as in embodiments of the first aspect of the invention above. However, in other respects normal operation of the software controller can be substantially as described above, the software controller obtaining new data tokens from the licence management server, to replace the current token and thus allow continued use of the software product (circumstance (a) above), by supplying either the exchange token or the current token to the licence management server. In the event of a device failure, the user can supply the exchange token to a new software controller as before. The new software controller, having no current data token but receiving the exchange token (circumstance (b) above), can supply the exchange token to the licence management server to obtain a current data token, whereby normal operation can continue with this software controller. However, the operation of the licence management server here serves to prevent fraudulent concurrent use on more than one software controller. In particular, for each new data token supplied to a software controller under the licence, the licence management server records the associated use period. When the next new data token is issued under the licence, the new use period for this next token is set such that it does not overlap the use period stored for the previously-supplied token. In this way, the licence management server ensures that only one current data token is given out per use period, i.e. that there is only one data token allowing use of the software product at any given time.

It will be apparent from the foregoing that licence management systems embodying the first and second aspects of the invention ensure availability of licences to legitimate users by allowing licences to be transferred in a simple and convenient manner, while inhibiting attempts to abuse the system and violate the licence. Embodiments of the invention thus provide an elegant solution to the problems associated with enforcing single-instance licences discussed above.

In general, any convenient form of data token may be used in embodiments of the invention. However, in particular preferred embodiments the data token comprises a coin. A coin is a particular form of data token, with special cryptographic properties, which is known for use as a means of payment in electronic payment systems, e.g. for on-line purchases or banking transactions. A particular feature of coins is that, by virtue of certain cryptographic properties, they can be "spent" (i.e. exchanged for appropriate value) anonymously. That is, through use of appropriate algorithms in the spending process, the cryptographic properties of the coin allow authenticity to be ensured while preserving anonymity of the spender. The principles of coin technology and various efficient implementations for coins (i.e. compact coin representations and efficient protocols for issue and exchange of coins) are well known in the art, the following being exemplary background references:

Stefan Brands, "Rethinking Public Key Infrastructures and Digital Certificates: Building in Privacy", The MIT Press, August 2000;

"Security without Identification: Transaction Systems to make Big Brother Obsolete", David Chaum, Communications of the ACM 28/10 (1985) 1030-1044;

"Untraceable Electronic Cash", David Chaum et al., Crypto '88, LNCS 403, Springer-Verlag, Berlin 1990, 319-327;

"Privacy Protected Payments—Unconditional Payer and/or Payee Untraceability", David Chaum, SMART CARD 2000: The Future of IC Cards, Proceedings of the IFIP WG 11.6 International Conference 1987, North-Holland, Amsterdam 1989, 69-93;

"Untraceable Off-line Cash in Wallet with Observers", Stefan Brands, Crypto '93, LNCS 773, Springer-Verlag, Berlin 1994, 302-318;

The implementation details of coin systems need not be discussed here, and for the present purposes it suffices to understand that a coin is essentially an anonymous data token, i.e. it can be used in a transaction while preserving anonymity of the user. Of course, the nature of coin systems is typically such that coins can also offer a high level of security against fraud. Coins can also provide additional desirable properties such as the property of "unlinkability" discussed further below. Thus, the use of coins as data tokens in preferred embodiments of the invention is highly advantageous, offering good security as well as protection of privacy for users.

In general, licence management systems embodying the invention may be employed for any type of software products, e.g. technical programs, or data files such as songs, movies or other audio/video files, and the user devices in question may be any type of device on which such software may be used, e.g. DVD or music players, mobile phones, PCs or other computing devices. In some embodiments, the software controller could be implemented by dedicated hardware for use with the user device. Typically, however, the software controller can be implemented by software running on the user device. Embodiments might therefore be envisaged where a program for implementing the software controller forms part of the licensed software product itself, e.g. where the licensed product is a technical program. Alternatively, the software controller may be implemented by a usage program which forms a platform for running the licensed product, e.g. a media player for running audio or video files.

The licence to use a software product, as represented by a given data token in the system, is effectively temporary in that use of the software product is allowed by the software controller substantially only during the use period of that token. Embodiments might be envisaged where the software controller will permit some limited use of the product outside the use period, for example in certain special circumstances only, but in general use is inhibited outside the use period. For simplicity in preferred embodiments, the software controller will permit use only during the use period of the current data token, so that if this use period expires without a new data token (which then becomes the new current token) being obtained, use of the software product will be prevented.

The use period associated with a data token could be defined in various ways in the system. For example, in some systems the use period could be preset in the software controller as a specified time from receipt of the current token. Preferably, however, the use period is indicated in the data token itself, e.g. as a specified time from receipt, or by a specified end time or by start and end times.

For convenience of the user, the exchange process for obtaining a new data token is preferably performed automatically by the software controller. In particular, for the exchange process in circumstance (a) above (i.e. to extend the licence beyond the use period of the current token), the software controller may automatically initiate the exchange process on or near expiry of the current use period, or when the device is next on-line after occurrence of the trigger event. This allows the licence renewal process to be transparent to the user provided access to the network is available.

In embodiments of the first aspect of the invention, when a current token is exchanged for a new token, the use period of the new token could be set to start at the end of the use period of the old token. This would make concurrent use of the software product on two user devices impossible. In such embodiments, the software controller could wait until expiry of the current use period before exchanging the token, though there is then the possibility of disruption if no network connection is available at this time. Alternatively, if the exchange process can be initiated before expiry of the current use period, the software controller could keep a copy of the old, exchanged token, allowing use of the software product during the unexpired use period of the old token until the use period of the new token commences. For simplicity, however, it is preferable in these embodiments for the use period of a new token to commence on issue of that token. In this case, if the new token is obtained before expiry of the old token, limited concurrent use will be possible. However, in preferred embodiments here, for a chain of first, second and third data tokens each obtained by the software controller via the exchange process to replace a previous token in the chain, the system ensures that the use periods of the first and third data tokens do not overlap. More generally, preferred systems are adapted such that the use periods associated with alternate data tokens in a chain of data tokens received by the software controller from the licence management server do not overlap. This feature (which can be implemented in various ways through appropriate setting of the use periods and/or by controlling times of the exchange process) prevents concurrent use of a software product by more than two software controllers in these embodiments. Of course, the potential concurrent use by two software controllers is only of limited duration as explained earlier. In addition, such concurrent use can be reduced to desired minimum levels by preferred features to be described.

In particular preferred embodiments, an exchange period may be associated with each data token in addition to the use period. In such embodiments, the system is adapted such that a new data token, to replace a current data token, can be obtained by the software controller only during the exchange period associated with that current data token. For example, the software controller may be adapted for initiating the exchange process only during the exchange period associated with the current data token. Like the use period, the exchange period is preferably (though not necessarily) indicated in the data token itself, for example by a start time, or by start and end times. The software controller may attempt to exchange a current data token on commencement of the exchange period, or as soon as on-line access to the licence management server is available thereafter.

In embodiments of the first aspect of the invention, the timing of the exchange period relative to the use period provides a convenient mechanism for controlling the potential concurrent use period discussed above. While the exchange period could begin on expiry of the use period, eliminating the possibility of concurrent use, it is preferred that the exchange period overlaps the use period to avoid possible disruption as discussed earlier. The extent of this overlap determines the maximum possible concurrent use period, and can be set as deemed appropriate in a given system as discussed further below.

In embodiments where the software controller enables user access to the exchange token, this can be achieved in a number of different ways and particular examples will be described below. Similarly, the licence management server in embodiments of the first aspect of the invention may employ various mechanisms for detecting double-exchange attempts as described further below.

While operation has been discussed thus far with reference to a single software product, in practice the software controller may control use of a plurality of software products, a respective data token being supplied and exchanged as described for each of the software products. Here, the identity of the particular software product to which a given data token relates can be indicated in the data token itself. However, if the user has licences for a large number of software products, e.g. hundreds of songs, then the provision and renewal of data tokens for individual products may become unrealistic. In such cases, it would be desirable to handle all licences under a single, umbrella licence and to manage the individual licences by applying the above system to the umbrella licence. To this end, in particular systems embodying the invention, a data token may represent a licence to use a plurality of software products. In such systems, the software controller may be further adapted for storing product data, indicative of said plurality of software products, at a back-up storage location, and allowing use of each of the software products substantially only during the use period associated with the current data token supplied by the licence management server. Various examples explaining operation of this type of licence management system will be given below.

Respective further aspects of the present invention provide a software controller and a licence management server of a licence management system as hereinbefore described. Respective additional aspects of the invention provide computer programs for implementing such software controllers and licence management servers. In addition, in general where features are described herein with reference to apparatus embodying the invention, corresponding features may be provided in a method embodying the invention, and vice versa.

BRIEF DESCRIPTION OF THE DRAWINGS

Embodiments of the invention will now be described, by way of example, with reference to the accompanying drawings in which.

DETAILED DESCRIPTION OF THE INVENTION

Figure 1:
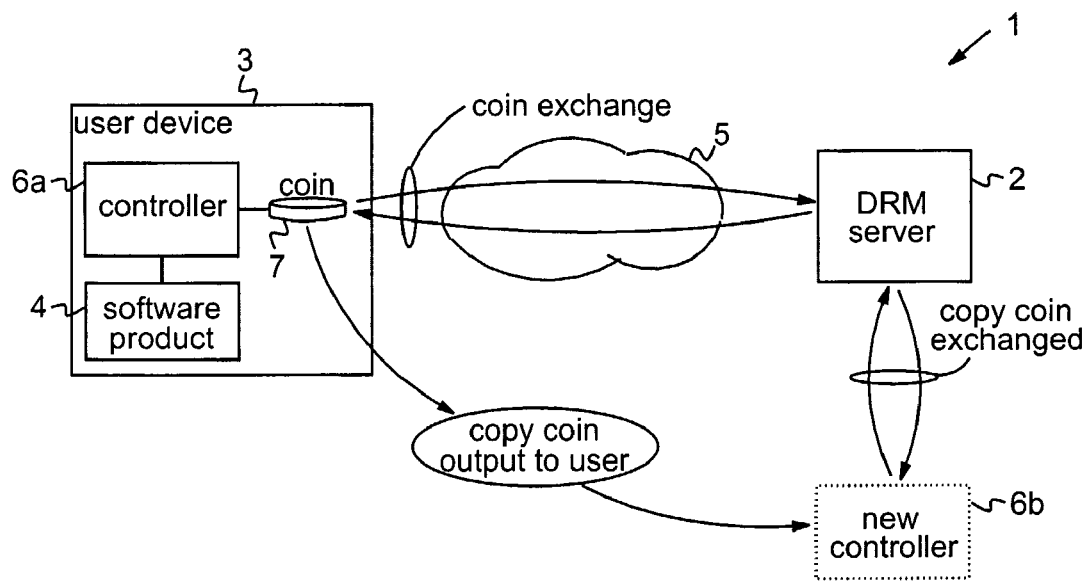
FIG. 1 is a schematic block diagram illustrating a first software licence management system embodying the invention.

The schematic of FIG. 1 illustrates the main components and basic operation of a first embodiment of a software licence management system. This system, indicated generally at 1, includes a licence management server in the form of DRM (Digital Rights Management) server 2 which is run by (or on behalf of) the licensor of a software product. The DRM server 2 can communicate with a user device 3, such as a user PC for example, at which the software product 4 may be run, via a data communications network 5 such as the Internet. More specifically, the system includes a software controller 6a for controlling access to software product 4 at the user device, and, in the presence of a network connection, software controller 6a and DRM server 2 can communicate via network 5 to perform the functions described below.

While DRM server 2 is represented by a single block in the figure, server 2 can be implemented in general by one or more computers running software which configures the computer(s) to perform the functions described below. Software controller 6a may be implemented in general by hardware or software or a combination thereof. For example, the software controller could be implemented by dedicated, preferably tamper-resistant, hardware associated with the user device. In the present embodiment, however, it is assumed that the software controller is implemented by a usage program running on user device 3 for controlling use of the software product 4. For example, the usage program implementing software controller 6a may be a media player for controlling access to a software product 4 in the form of an audio or video file. In general, however, where the functions of the software controller or DRM server are implemented by a computer program, such a program may form part of a larger program for performing various, more general control functions, and may be supplied separately for loading in a computing device to configure the device to perform the functions described. In particular, the program code means constituting such a computer program may be supplied embodied in a computer-readable medium, such as a diskette or an electronic transmission sent to a user or system operator, for loading in a computing device.

In operation of system 1, a temporary licence to use software product 4 is represented by a data token in the form of a coin 7 supplied to software controller 6a by DRM server 2 as described further below. For simplicity, the following description will focus on a single software product 4, though in practice the software controller 6a may control use of a plurality of software products 4, each having a temporary licence represented by a respective coin 7. Thus, the identity of the particular product 4 to which a given coin relates may be encoded in the coin 7. Coin 7 can be implemented in generally known manner as discussed earlier, and has particular cryptographic properties associated with coin systems whereby the coin can be exchanged anonymously (i.e. without identifying the device which supplies the coin for exchange) in the exchange process described below. In addition to the fundamental properties of a coin, the coin 7 has two associated validity periods, namely a use period and an exchange period. The use period is defined by a start time $P_1$ and an end time $P_2$, and the exchange period is similarly defined by start and end times $Q_1$ and $Q_2$ respectively. These periods, as defined by their start and end times, are encoded in the coin in generally known manner, using standard techniques for encoding values into coins. In this embodiment, the use and exchange periods are defined such that there is only a short overlap between the two periods. In particular, $Q_1$ precedes $P_2$ by a relatively small time period compared to the use period $P_2$-$P_1$. By way of example, the use period $P_2$-$P_1$ may be one week, and the overlap $P_2$-$Q_1$ may be only one day. The exchange period $Q_2$-$Q_1$ may be long in comparison to the use period, for example several years. The start of the use period, i.e. time $P_1$, is set to the time at which the coin is supplied to software controller 6a in this embodiment. The operation of the software controller on receipt of such a coin is represented in the schematic flow chart of FIG. 2, and will be described below assuming initially that the software controller has just received a coin from DRM server 2.

Figure 2:
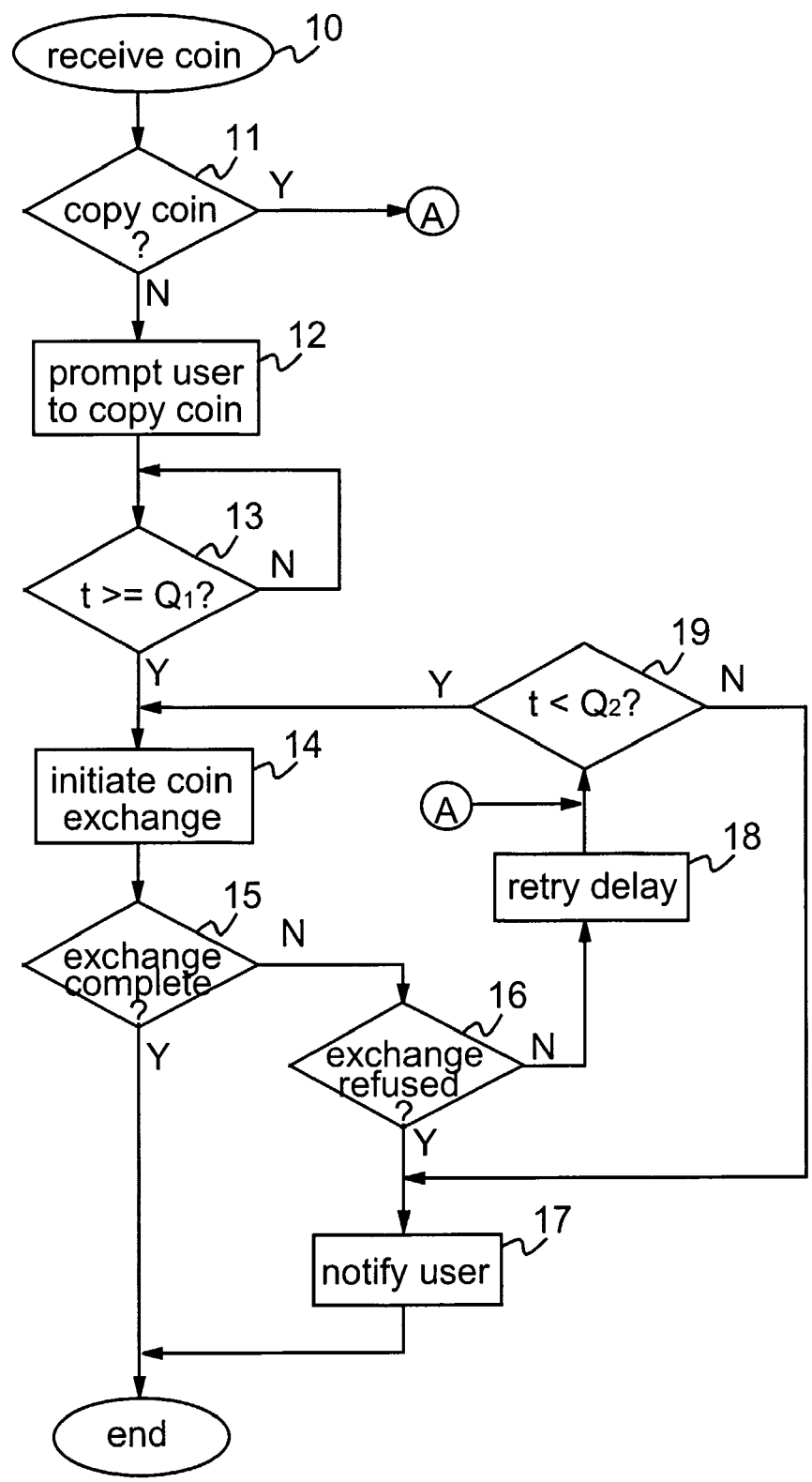
FIGS. 2 and 3 are flow charts illustrating operations performed by a software controller in the system of FIG. 1.

Receipt of the coin 7 by software controller 6a is represented by step 10 of FIG. 2. In step 11, the software controller determines whether the received coin is a copy coin (see below). Since coin 7 has been received from DRM server 2 in this case, the coin is not a copy coin and operation continues to step 12. Here, the software controller prompts the user to make a copy of the newly received coin. For example, software controller 6a may display a message requiring the user to input a storage location, e.g. on a diskette inserted in user device 3, and in response to appropriate user action the software controller then supplies a copy of coin 7 to the storage location supplied. In this way, a copy of coin 7 is effectively output to the user as indicated in FIG. 1. (In this system, therefore, the copy coin serves as the exchange token discussed earlier, whereby the exchange token (copy coin) and current data token (coin 7) are identical in this embodiment). Next, the software controller effectively awaits the start of the exchange period, e.g. by comparing the current time t with time $Q_1$ encoded in coin 7 as indicated by decision step 13 in FIG. 2. On commencement of the exchange period, i.e. $t \geq Q_1$, operation proceeds ("Yes" at step 13) to step 14 whereupon software controller 6a automatically initiates the coin exchange process. This process involves the software controller supplying the current coin 7, via network 5, to the DRM server 2 to be exchanged for a new coin. In step 15 the software controller determines if the exchange process has been successful, i.e. a new coin has been successfully received from DRM server 2. If not, ("No" at step 15), the software controller determines at step 16 whether the exchange has been refused by the DRM server as discussed further below. If so ("Yes" at step 16), the software controller displays a message at step 17 to notify the user, and the process then terminates. If not ("No" at step 16), i.e. if the exchange process has failed for some other reason such as a disrupted connection or lack of availability of a network connection, the software controller will retry the exchange process, after an appropriate retry delay represented by step 18 in the figure. First, however, the software controller checks at step 19 that the exchange period for the coin has not yet expired, i.e. that $t < Q_2$. If the exchange period has expired ("No" at step 19), then operation proceeds to step 17 where the user is notified of the failure, and the process terminates. Assuming the exchange period has not expired ("Yes" at step 19), then operation reverts to step 14 to retry the exchange process. Assuming that the exchange process is ultimately successful ("Yes" at step 15), then the process is complete for the old coin 7. The new coin received from the DRM server then becomes the new current coin 7, and the FIG. 2 process is repeated for this coin. This new coin 7 has new use and exchange periods as described above, with the start time $P_1$ of the new use period set to the time of supply of the new coin. In this way, the licence to use the software product 4 is extended beyond the use period of the old coin, and can be continually renewed as each successive current coin is exchanged for a new coin.

Figure 3:
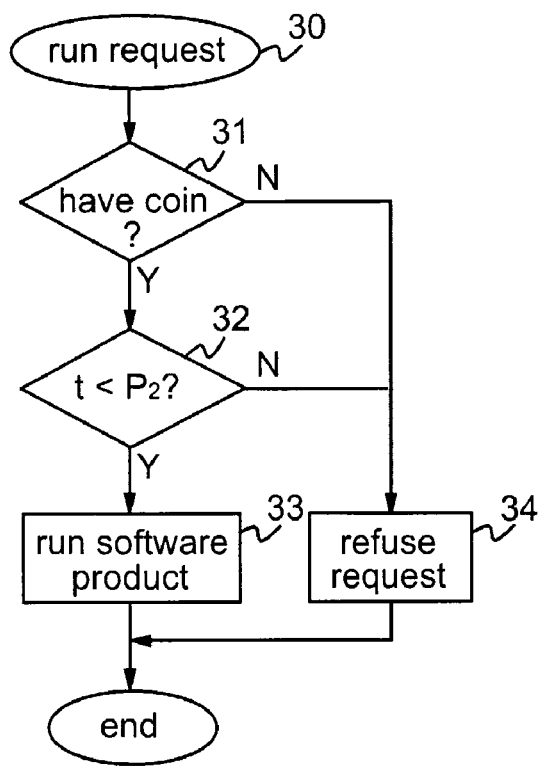

At any given time while the FIG. 2 process is underway, software controller 6a controls use of the software product 4 in accordance with the current coin 7. In particular, the operation of the software controller in response to a user request to run software product 4 is indicated in FIG. 3. Receipt of the user request is represented by step 30 in this figure, and operation then proceeds to step 31 where (on the assumption that the software controller may hold coins for a plurality of software products) the software controller checks whether a current coin is held for the software product 4 in question. Assuming the product identity encoded in a current coin matches that of the software product 4 ("Yes" at step 31), then software controller 6a checks in step 32 that the use period of the coin 7 has not yet expired, i.e. whether $t < P_2$. Assuming so ("Yes" at step 32), then use is permitted under the licence and the software controller will run the software product 4 in step 33. Reverting to step 31, however, if no current coin is found for the software product here ("No" at step 31), then the product is unlicensed. The software controller then displays a message at step 34 refusing the run request and the process is complete. Similarly, if the use period of the current coin for the software product is found to have expired at step 32 (because exchange of this coin has failed for some reason), then running of the software product will be refused at step 34 and the process terminates. (Where appropriate, a coin exchange process could be started at this point if none is ongoing).

Referring back to FIG. 2, the operation has been described above for the case where a coin received by the software controller 6a is supplied by the DRM server 2. However, a software controller may also receive a copy coin which is supplied by the user. Suppose, for example, that user device 3 breaks down preventing access to the software controller 6a.

The user can acquire a new user device, with a new, similar software controller as indicated at 6b in FIG. 1. (Software controller 6b operates in all relevant respects identically to software controller 6a in this embodiment, so that any description of the operation of one applies equally to the other). The licence for software product 4 can be transferred to software controller 6b by inputting the exchange token, here the copy coin previously stored by the user, to the new controller. Following receipt of this coin at step 10 of FIG. 2, the coin will be identified as a copy coin in step 11. (Essentially, any coin not received pursuant to the exchange process described above will be identified as a copy coin here). Operation then proceeds ("Yes" at step 11) directly to step 19 to check that the exchange period for the copy coin has not yet expired. If it has, the user will be notified at step 17 and the process will terminate. Assuming, however, that the exchange period has not expired at step 19, then operation will proceed to step 14 whereupon the coin exchange process is initiated over network 5 and proceeds as described above. Thus, the copy coin is automatically exchanged by the software controller for a new coin. Use of the software product can continue under the new coin as already described, whereupon the licence has been successfully transferred to the new software controller 6b.

When a licence is first acquired for a software product, an initial coin, with use and exchange periods as described above, could be supplied by the DRM server 2 in some embodiments, e.g. if the initial product licence is purchased on-line. Preferably, however, when a user buys a brand new licence (e.g. by purchasing a software product at a shop or from a web site), he receives a special coin which he can enter into any software controller 6a, 6b as described above. This initial coin has no use period but has an exchange period defined by an end time $Q_2$ for the exchange period. When supplied to the software controller, this initial coin (not having been supplied following an exchange process with the DRM server), will be treated exactly like a copy coin as described above. Thus, assuming the software controller receives the initial coin before expiry of its exchange period, it will be exchanged for a new current coin by the process already explained, and operation will continue in the normal way.

Figure 4:
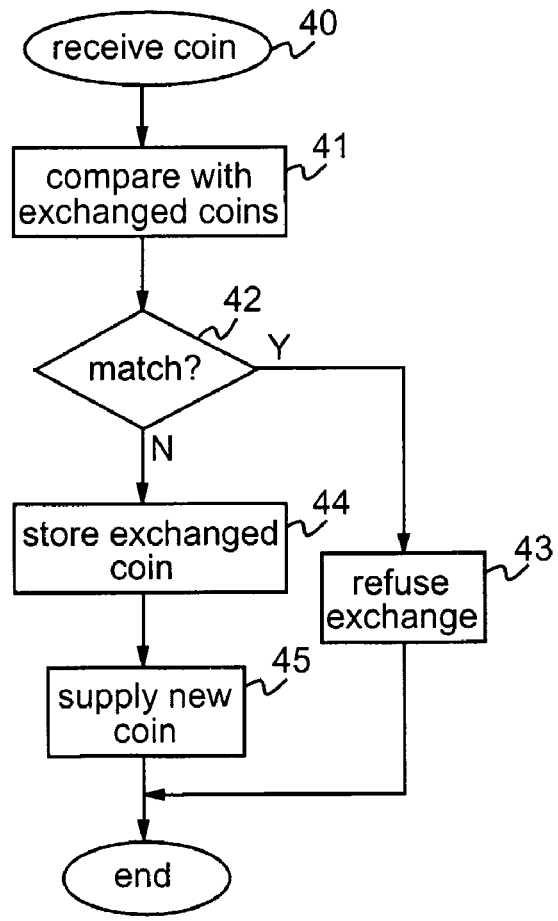
FIG. 4 is a flow chart illustrating operation of a licence management server in the FIG. 1 system.

The operation of DRM server 2 on receiving a coin for exchange from software controller 6a is illustrated in FIG. 4. Receipt of the coin is represented by step 40 in the figure. Operation proceeds immediately to step 41 whereupon the DRM server 2 checks whether the same coin has been previously received and exchanged for a new coin. In this embodiment, the DRM server does this in step 41 by comparing the received coin with a stored list of coins previously received and exchanged by the server. If the received coin matches a coin on this list, as indicated by a "Yes" at decision step 42, then the received coin has already been "spent". In this case, operation proceeds to step 43 where the DRM server returns a refusal notification to the software controller, and the process terminates. Assuming, however, that the received coin has not already been spent ("No" at step 42), then this coin can be exchanged for a new coin. In step 44 the DRM server thus stores the received coin as an exchanged coin in the aforementioned "spent coins list", and the new coin is supplied to the software controller in step 45. This new coin has use and exchange periods as described above, with the start time $P_1$ of the use period being set to the current time. The process is then complete.

Figure 5:
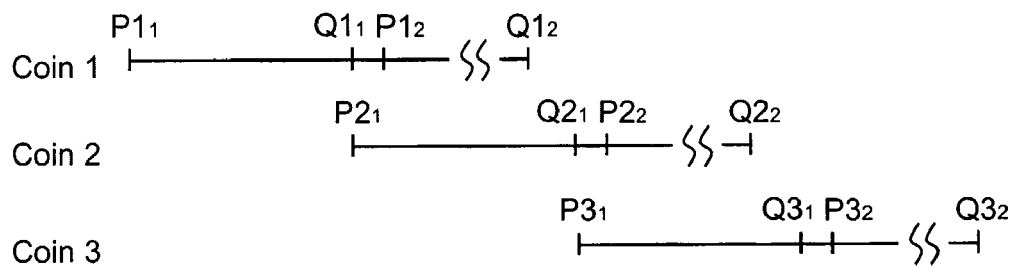
FIG. 5 is diagram illustrating the relationship between use periods of successive data tokens in a chain of exchanged data tokens in the FIG. 1 system.

It will be seen that the system operation explained above ensures availability of licences to the user by providing a simple and convenient mechanism for transferring licences to a new device when necessary. However, the system also operates to frustrate a user who attempts to defraud the system by using the licence on multiple devices concurrently. Specifically, while a copy of a current coin, serving as the exchange token here, is made available to the user for transfer purposes, this copy coin cannot itself be used on a new device. This is because copy coins can only be exchanged, not used, by the software controller. Though a fraudulent user may exchange a copy of a first coin to commence use of the software product on a new device while continuing use on a first device, the first coin will soon expire. This coin cannot be exchanged since the DRM server will detect that the coin has already been exchanged by the new device, so use of the software product on the first device will be disabled when the use period expires. Moreover, the relatively small overlap of the use and exchange periods for a coin means that the potential period of concurrent use by two software controllers is correspondingly short. This is clearly illustrated in FIG. 5 where the use and exchange periods for three coins in a chain of exchanged coins are indicated in relation to one another. For Coin 1 in the figure, the use and exchange periods are delimited by $(P1_1, P1_2)$ and $(Q1_1, Q1_2)$ respectively. If this coin is exchanged for Coin 2 at the earliest opportunity (i.e. at $t=Q1_1$), then the equivalent use and exchange periods for Coin 2, delimited by $(P2_1, P2_2)$ and $(Q2_1, Q2_2)$, are as shown in the figure. Similarly, the use and exchange periods for a third coin, Coin 3, supplied as early as possible in exchange for Coin 2 are as shown by $(P3_1, P3_2)$ and $(Q3_1, Q3_2)$ in the figure. It can be seen firstly that there is no overlap between the use periods of Coin 1 and Coin 3 in this system. The potential for concurrent use is therefore limited to a maximum of two software controllers. Moreover, the maximum possible concurrent use period, i.e. $P1_2 - Q1_1$ is very short (only one day in this specific example), and in general can be set to a desired acceptable level for a given system.

While the basics of the coin exchange process have been explained in simple terms above, it will be apparent to those skilled in the art that the detailed implementation of this process may utilize various known algorithms and protocols governing the issue and spending of coins in existing coin systems. Thus, for example, when a coin is supplied to the DRM server for exchange, a basic payment algorithm, used for spending coins in existing systems, may be implemented by interaction of the software controller and DRM server. Similarly, the supply of a new coin to a software controller may be performed by interaction of the software controller and DRM server to implement a basic coin issue algorithm. Here, the new coin may be partially constructed by the software controller, this partial coin being sent to the DRM server for validation. The supply of the new coin by the DRM server may then comprise returning the partial coin with a validating portion (such as a digital signature), which confirms the new coin as a valid coin. In any case, it will be appreciated that the use of coins to represent licences in the above system offers a high level of security while protecting privacy of the user. In particular, since coins can be spent anonymously, licences can be renewed and transferred anonymously too. Hence, the DRM server cannot keep track of who is using the licence and on which software controller. Moreover, coins may have the additional property of "unlinkability", i.e. any given coin cannot be identified as associated with (i.e. "linked to") a coin for which it has been exchanged, or indeed any previous or subsequent coins in a chain of exchanged coins. Thus the user can be assured that no information can be collected by the licensor about the nature and extent of his usage activities.

Overall, therefore, the foregoing embodiment provides a highly efficient licence management system, allowing enforcement of licences while ensuring transferability and privacy for the user.

While the software controller 6a supplies a copy of the current coin to the user in the above embodiment, the software controller could enable user access to the copy coin in other ways. For example, the software controller could store the copy coin at a back-up storage location, e.g. at the DRM server, and supply some form of access data to the user to enable the user to retrieve the copy. Such access data might simply be the storage location itself, or, for instance, the location plus an access code for the copy coin.

In the above embodiment, the DRM server 2 stores each "spent" coin in a list for comparison with subsequently received coins. It is preferable to store each coin in its entirety in this list so that the whole coin is available as proof if a user disputes an exchange refusal. However, this is not essential and the DRM server could simply store a token identifier corresponding to a spent coin, e.g. the signature or other validating portion of an issued coin or a form value thereof. Moreover, the DRM server may use a variety of mechanisms for detecting if the same coin is received twice for exchange. For example, the DRM server could maintain a list of all issued coins, and delete a coin from the list when that coin is subsequently exchanged. Then a received coin will be identified as already spent if it does not appear on the list. (The special, initial coins discussed above could be identified as such here and excluded from this check). In general, the detection of previously spent coins may be carried out in accordance with the various mechanisms known for detecting "double-spending" of coins in existing coin systems. Such mechanisms are preferably on-line mechanisms, performed as part of the exchange process, so that a new coin is only supplied in exchange for a coin that has not already been spent. However, off-line mechanisms might also be used, whereby a new coin is supplied in exchange for a received coin before checking whether the received coin has been double-spent. If double-spending is subsequently detected, appropriate action can then be taken to penalize the user. (While coins are anonymous, known coin systems employing such off-line mechanisms are designed such that double-spending of a coin provides more information about the spender's identity than spending a coin once, and sufficient information to enable appropriate action—such as refusing further coin exchanges—to be taken. The guarantee that the correct spender's identity is encoded into a new coin can either be given by the software controller, or be proven by cryptographic zero-knowledge mechanisms in comparison with the old coin in an exchange).

In the foregoing example, the coin exchange period $Q2_1$-$Q_1$ is long to provide plenty of time for exchanging coins. However, the use period is comparatively short and the overlap of the use and exchange periods is small relative to the use period. These features force frequent exchange of coins and keep the potential for fraud to a desired minimum level. In event of breakdown, in the worst case user has to wait a matter of days ($Q_1$-$P_1$) until start of the exchange period to commence use on a new device. However, the relative lengths and overlap of the use and exchange periods can be set to provide the particular properties deemed appropriate for a given system. For example, in other embodiments it may be desirable to reduce the frequency of coin exchanges to provide legitimate users with greater scope for off-line usage, while maintaining the potential for fraud at acceptable levels. In such embodiments, the use period of coins may be longer, with a long overlap provided between the use and exchange periods.

The software controller may then try to exchange a coin as soon as the exchange period commences to frustrate fraud, while the remaining use period allows a more generous off-line use time. In some embodiments, the periods may be chosen differently depending on the user or type of licence. For instance, a user may have the choice between short and long use periods, the former providing shorter waiting times after failure of a device and the latter requiring fewer exchanges and thus less online activity.

In the system described above, the coin exchange process is effected by interaction of the DRM server 2 and software controller 6a, 6b, and embodiments might be envisaged where the DRM server needs to verify that it is interacting with a valid software controller. For example, use of the licensed software product might require provision of certain secret information to the software controller. Thus it may be desirable to provide a mechanism which allows a software controller to prove to the DRM server that it is a valid and correct software controller, and the DRM server to identify itself to a software controller, and all without enabling the DRM server to identify the specific software controller (since this would destroy user privacy). This can be achieved in various standard ways as will be apparent to those skilled in the art. By way of example, the DRM server might authenticate itself using SSL/TLS (Secure Sockets Layer/Transport Layer Security) with a server certificate that can be checked by any software controller. Software controllers might authenticate themselves through anonymous credentials (see for example "An Efficient System for Non-transferable Anonymous Credentials with Optional Anonymity Revocation", Jan Camenisch et al., EUROCRYPT 2001, LNCS 2045, Springer-Verlag, Berlin 2001, 93-118). Such credentials prove a certain right without revealing anything else. If the credential is shown over the previously established and authenticated SSL/TLS channel, then this channel can be used to send secret information from the DRM server to software controllers with the guarantee that the secrets are delivered confidentially to correct software controllers only. In addition, the protocols for establishing a secure channel to the DRM server, receiving secrets and exchanging coins do not identify the individual software controller.

The software controller in the above system is adapted to initiate the exchange of a current coin only during the exchange period of that coin. However, the system could employ other mechanisms to ensure that a current coin can be replaced by a new coin only during the exchange period of the current coin. For example, DRM server 2 could be adapted to exchange a received coin only if the exchange period of that coin has not yet expired. In embodiments where the DRM server keeps a list of issued coins, coins can then be deleted from this list when their exchange period has expired.

In the FIG. 1 system, the exchange token is a copy of the current coin 7, so that the exchange token and current data token are identical in this case. In general, however, the exchange token may depend in various ways on the current data token, the dependence here providing a basis for detection of double-exchange attempts. For example, the exchange token could be a short form of the current data token and could be supplied with the current token by the licence management server or derived from the current token by the software controller. The new exchange token can then be made available to the user after each exchange process for transfer to a new software controller if required. Also, in normal operation of the software controller, each exchange process could be performed by supplying the exchange token, rather than the current data token, to the licence management server. The licence management server might be able to derive the corresponding current data token from an exchange token, or might, for example, store a copy of each issued data token and identify the appropriate issued data token from information in the exchange token. By virtue of such dependence between the exchange token and current data token, the licence management server can check whether a received token corresponds to a token which has already been exchanged as described above.

Figure 6:
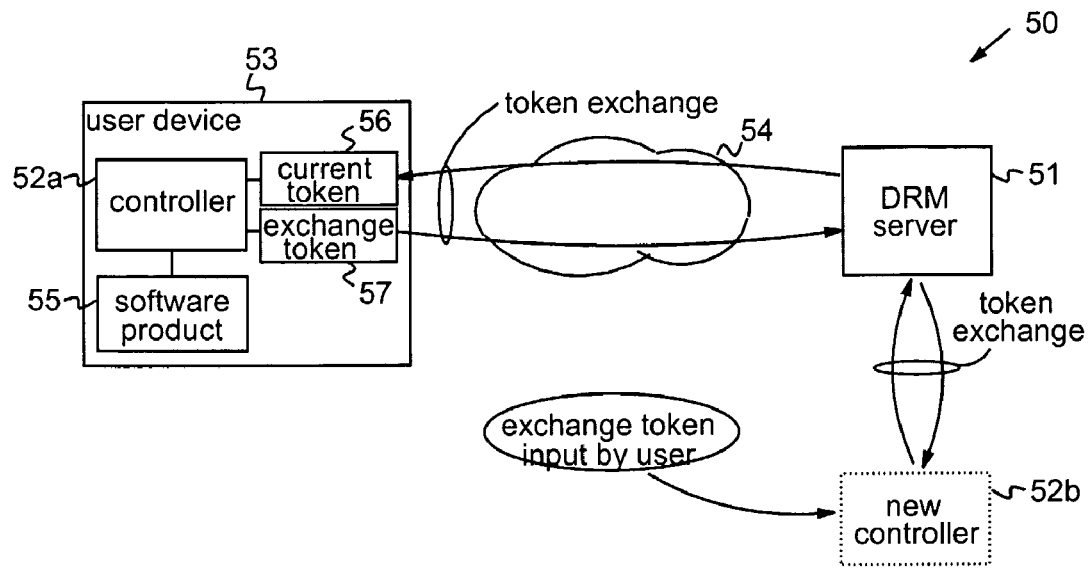
FIG. 6 is a schematic block diagram illustrating a second software licence management system embodying the invention.

While the above embodiment offers a high level of user-privacy, various alternative embodiments can be envisaged where user-privacy is of lower priority. One example of such an alternative embodiment is illustrated in FIG. 6. The system 50 of FIG. 6 comprises a DRM server 51 and a software controller 52a running on a user device 53, the software controller and DRM server communicating via a network 54. Software controller 52a controls use of a software product 55 generally as before based on the use period associated with a current data token 56. Here, however, the software controller also has an exchange token 57 which is associated with the licence to use the software product. In this system, it is assumed that the exchange token 57 is essentially a fixed representation of the licence, for example a licence number, which is known to DRM server 51. This exchange token may be obtained from DRM server 51 on initial purchase of the licence for example, and is held by the user for use in the event of a device failure. If the exchange token is initially obtained by software controller 52a on commencement of operation, then the software controller will enable user access to the exchange token for this purpose. Alternatively, the exchange token may be obtained directly by the user on purchase of a licence, whereby the user can supply the exchange token to any software controller to begin use of the software product.

In normal operation, software controller 52a permits use of a software product 55 at the user device during the use period associated with the current data token 56 as in the FIG. 1 system. When it becomes necessary to obtain a new data token to extend the licence, however, software controller 52a supplies the exchange token 57 to DRM server 51. DRM server 51 then supplies a new data token in exchange. The new data token has a new use period, and replaces the current data token at software controller 52a as before, whereby use of software product 55 can continue. However, each time DRM server 51 issues a new data token under the licence in question, the use period of the newly-issued token is recorded against the licence number by the DRM server. The next time the exchange token is supplied to DRM server 51 for exchange, the DRM server identifies the licence in question from the exchange token, retrieves the stored use period for the previously-issued token, and sets the use period for the new token to start on expiry of the previous use period. In this way, the DRM server ensures that the new use period does not overlap the old use period, whereby at any given time only one data token permits use of the software product. When the exchange process is performed by software controller 52a before expiry of the use period of the current token 56, the software controller keeps a copy of the old, exchanged token, allowing use of the software product during the unexpired use period of this token until the use period of the new token commences. The licence can also be legitimately transferred to a new software controller 52b in the event of a failure at user device 53. In this case, the user simply supplies the exchange token 57 to the new software controller 52b. When software controller 52b, which has no current data token 56, receives the exchange token 57, it simply supplies the exchange token to DRM server 51 to be exchanged for a current data token 56 as before, whereby use of the software product 55 can continue with new software controller 52b. However, since the use period of the newly-issued token does not overlap that of the last token issued to software controller 52a, the system prevents the fraudulent user from using the software product on more than one device concurrently.

The embodiment of FIG. 6 provides a simple solution to the problems associated with transferability of single-instance licences, but offers less user-privacy than the FIG. 1 system since the exchange token is associated with the licence in question whereby the DRM server could in theory monitor usage activities of particular users. The use of such particularly simple forms of exchange tokens may nonetheless be preferred in some systems. Of course, alternatives can again be envisaged. For example, in normal operation software controller 52a could supply the current data token, rather than the exchange token, to the DRM server for exchange, the exchange token being used only for transferring the licence to a new device. The current data token itself may take various forms, and might even be a coin in some embodiments, though the privacy advantages offered by coins are not strictly required here. Also, other forms of exchange token, including updatable exchange tokens, can be envisaged. For example, instead of a single, fixed exchange token as described above, a list of one-time passwords or hash chains might be employed whereby the exchange token is updated for each successive exchange. Again, these will be associated with the licence in question whereby the DRM server can identify the appropriate licence, but the updating of the exchange token ensures that an old exchange token retrieved from an old user device cannot be used to take over the licence once the user has migrated to a new device.

In the embodiments described thus far, a software controller may control use of a plurality of software products, a respective coin being supplied and exchanged as described for each of the software products. However, if the user has licences for a very large number of software products, such as hundreds of songs, then it may be more convenient for the user for all individual licences to be combined under a single umbrella licence, or "meta-licence", whereby all the individual licences can effectively be renewed together. An example of such a licence management system embodying the invention will now be described with reference to FIG. 7 which illustrates the main components and basic operation of the system.

Figure 7:
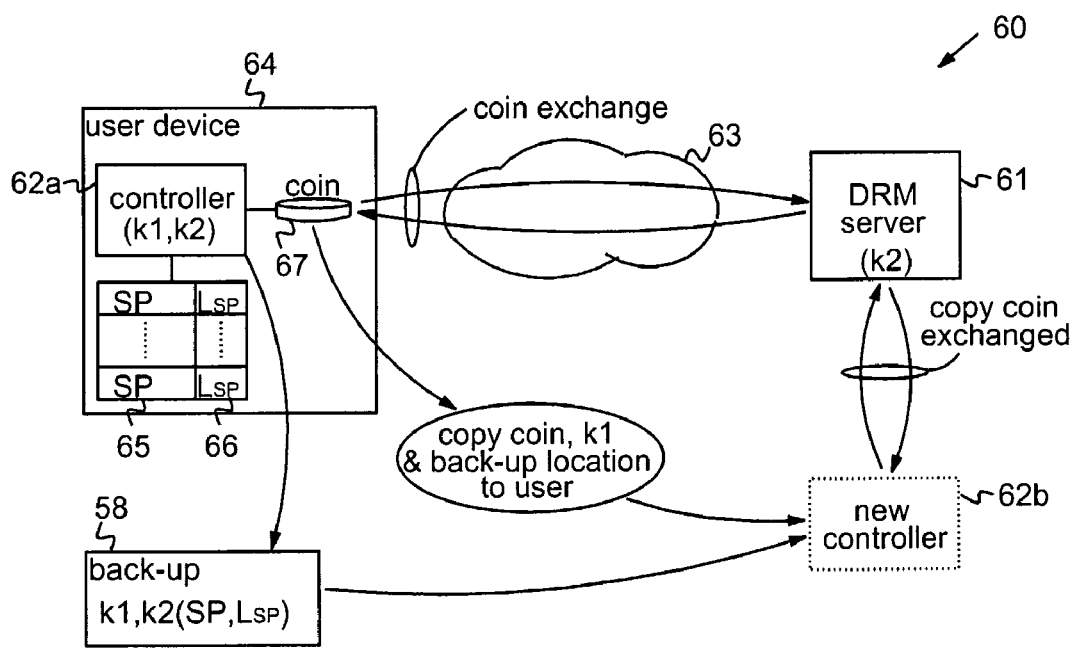
FIG. 7 is a schematic block diagram illustrating a third software licence management system embodying the invention.

The system 60 of FIG. 7 comprises a DRM server 61 and software controller 62a which operate generally as described for system of FIG. 1 above but with certain differences to be described. Thus, the software controller 62a can communicate with DRM server 61 via a network 63, and controls use of a plurality of software products at a user device 64. The collection of software products SP is indicated schematically at 65 in the figure, and for each of these the user holds an individual product licence $L_{SP}$ as indicated collectively at 66. The particular form of these individual licences 66, and the way in which they are obtained, is independent of the system operation to be described. However, use of all of the software products 65 is controlled by software controller 62a in accordance with a single data token in the form of coin 67. In this embodiment, therefore, coin 67 represents a meta-licence for the plurality of software products 65. For example, such a meta-licence may correspond to a particular type or category of software products, such as songs, movies, etc., and may therefore be provided for a particular type of software controller adapted for accessing such products, e.g. a music player, video player, etc. Alternatively for example, the software controller may be implemented by a "meta-usage program" serving as an operating platform for specific usage programs, with the coin representing a licence to use the software products run by these specific usage programs. By way of example, in the present embodiment it is assumed that the software controller 62a is implemented by an audio player program and the individual software products 65 are audio files for songs.

In this embodiment, the licensing system based on coins 67 is supplemented by two long-term secret keys, k1 and k2. As indicated in the figure, software controller 62a holds both keys k1, k2 for the meta-licence, whereas the DRM server 61 knows only the second key k2 corresponding to the meta-licence. These keys k1, k2 can be set up in any convenient manner, as will be apparent to those skilled in the art, on commencement of the meta-licence, for example on acquisition of the first coin 67 from DRM server as described above for the first embodiment. Once the keys have been set up, the software controller 62a encrypts product data indicative of software products 65 under both keys k1, k2, and stores this encrypted data at a back-up storage location. The back-up storage is indicated at 68 in the figure, and in general this may be at any convenient storage location, for example on some other user device, or at the DRM server, or at some third party storage location. In this example, the product data encrypted by software controller 62a comprises the software products SP themselves and the associated individual licences $L_{SP}$ as indicated in the figure. The initial back-up is made by software controller 62a on commencement of the meta-licence, and further back-ups are then made regularly thereafter in operation, for example periodically or when new individual licences are obtained for further software products 65. Such further back-ups may be complete or incremental as desired.

The operation of the system using coin 67 is then broadly as described with reference to the FIG. 1 embodiment. Thus, coin 67 has use and exchange periods as described above, and software controller 62a allows a licensed software product 65 to be run only during the use period of the current coin 67. In particular, on receipt of a user request to run a product 65, the operation of the software controller is substantially as shown in FIG. 3, except that the software controller checks in step 31 that an individual licence $L_{SP}$ is held for the product in question and then moves on to step 32 for the current coin 67. The current coin 67 is regularly exchanged for a new coin as described above with reference to FIG. 2. However, in step 12 of FIG. 2 for this embodiment, the software controller 62a supplies a copy of the current coin, together with the first key k1 and the storage location of the encrypted product data in back-up 68, as indicated in FIG. 7. These can then be stored by the user for use in the event of a breakdown.

The operation of the DRM server 61 is also generally as described for server 2 of the FIG. 1 system, but in this case the DRM server stores the second key k2 for the meta-licence in association with the current coin 67. For example, the stored key k2 could be cross-referenced with a token identifier for the current coin (where the token identifier here may be the coin itself), so that the key k2 associated with a given coin can be retrieved when that coin is received for exchange. Then, whenever the DRM server 61 supplies a new coin in exchange for an old coin in this embodiment (corresponding to step 44 of FIG. 4), the DRM server supplies the associated key k2 together with the new coin.

In the event of breakdown of user device 64 in this embodiment, the user can input the copy coin previously supplied by software controller 62a, together with the key k1 and back-up storage location of the encrypted product data, to another, identical software controller as indicated at 62b in FIG. 7. The new software controller identifies the supplied coin as a copy coin (step 11 of FIG. 2), and thus sends the coin to DRM server 62 for exchange. The DRM server then exchanges the copy coin for a new coin which is returned to software controller 62b with the second key k2. Software controller 62b then has both keys, and can access the back-up storage 68 to decrypt the product data and take over all individual licences $L_{SP}$. Operation with the new software controller can then continue in the usual way.

It will be seen that the FIG. 7 embodiment provides a convenient system for controlling use of a large number of licensed software products under a single meta-licence represented by coin 67. The meta-licence and individual product licences can be easily transferred to a new device in the event of breakdown, but the exchangeable coin system provides protection against fraud in the same way as the first embodiment described above. In addition, the first key k1 in the above system ensures privacy of the back-up for the user, while the second key k2 ensures that the user himself cannot use the back-up illegitimately on other devices.

While the data token representing a meta-licence is a coin 67 in the FIG. 7 embodiment, since there is only one meta-licence for each key k2, there is no point in keeping the different tokens belonging to the same licence unlinkable. Thus, more simple representations may be used for the data token here if desired. For example, the token could simply be a one-time password (e.g. of a pre-image of a one-way function if one wants accountability of whether a coin has already been spent). To exchange such a data token, the software controller may send the one-time password to the DRM server over a secure channel as described above. In any case, if the chain of exchanged data tokens is not unlinkable, where the user has forgotten to store a current token but still has at least one previous token in the chain, the DRM server could be adapted to allow exchanging of this previous token for a current token while making sure that, for a given usage period, two tokens are not released for the same meta-licence.

The user's task can be further simplified in the FIG. 7 embodiment if the software controller always stores the current coin, encrypted under k1 only, at the back-up 68. In this case, the software controller only needs to supply the user with k1 and the location of the back-up. These can be supplied where necessary to a new software controller, which can then retrieve and decrypt the current coin before supplying it to the DRM server. The user might also use a third key k3 to encrypt k1, where k3 might be a weak password. Various other possibilities can be envisaged here to provide a good balance of availability and confidentiality of the back-up.

Overall, the FIG. 7 scheme offers the same security to the DRM server as the previous embodiment. The user loses a degree of privacy in that the DRM server could monitor when a specific meta-licence gets renewed, though this is not really significant if the meta-licences are coarse enough because most devices will renew their meta-licences on a regular basis. Additionally, the length of the back-up 68, if stored at a server, gives a certain amount of information. Since software controllers have no identity the user might still change the software controller without the DRM server identifying this, and he might have multiple meta-licences without enabling the DRM server to link them.

Note that, while the DRM server in the FIG. 7 embodiment supplies the key k2 every time a new coin is supplied in exchange for an old coin, it only need do this when the received coin is a copy coin. Thus, in other embodiments, the DRM server might only supply k2 with a new coin in response to an indication (provided by the software controller for example) that the received coin is a copy coin. Also, while the product data encrypted and stored at the back-up comprises both the individual software products and their licences here, embodiments might be envisaged where the product data simply comprises some form of identifying data which enables the individually licensed products to be identified for future use. The individual licences $L_{SP}$ themselves may be represented in any convenient manner, for example by individual data tokens.

Various alternative systems can be envisaged in which the software controller is adapted to allow use of any of a number of software products only if a current data token is held for the meta-licence and an individual product licence $L_{SP}$ is held. For example, meta-licences may be renewed and/or transferred using various forms of exchange token as described earlier. The individual licences $L_{SP}$ may be obtained in a variety of ways, e.g. from the DRM server or some other related server, and this server may make the individual licences available in a form specifically bound to the meta-licence. As one example, in a particularly simple embodiment an exchange token for renewing the meta-licence could be a fixed, clear-text long-term licence with a licence number N. When buying an individual product licence $L_{SP}$, the user indicates under which meta-licence number N it is bought. The individual licence $L_{SP}$ here could be signature under a licence text allowing use of the product SP under meta-licence number N. (This is almost as if the individual licence were bound to a specific user device, only the device is virtual and defined as whichever real device currently owns the meta-licence). A software controller can use the exchange token for the meta-licence to obtain a current data token for the meta-licence generally as described earlier, and then only permits use of the software product SP if it has the current data token for the meta-licence N specified in the individual licence $L_{SP}$. The software controller stores the individual licences $L_{SP}$ at a back-up location as before (and this back up is preferably encrypted for security reasons under a key, like k1 above, which is known to the user), whereby the individual licences can be taken over by a new software controller on transfer of the meta-licence.

The alternative embodiment just described provides a particularly simple implementation, but does not offer a high level of user privacy. In particular, even if anonymous purchasing of individual product licences is possible, all individual licences bought by one user under one meta-licence are linkable by the number N. This can be avoided by encrypting the back-up under a key, like k2 above, which is known to the software controller and DRM server but not the user. The exchange token for the meta-licence can still be a fixed, clear-text long-term licence but here it is a licence to use the key k2. In the licence text, k2 is indicated by an identifier (such as an index to a database of keys k2) which allows the DRM server to retrieve k2 but does not give the user (who sees the meta-licence) information about k2. A new software controller obtains the key k2 together with the current data token via the mechanisms described earlier for a DRM server to confirm that it is interacting with a valid software controller. As before, one-time passwords or hash chains might also be used as an alternative to the fixed exchange token in this embodiment.

As a further example, where coins are used for renewing the meta-licence to provide greater privacy, successive coins could be made unlinkable if a coin designates k2 in a way that the DRM server cannot see in "normal" exchanges, but only when the meta-licence is transferred to a new software controller and the new controller explicitly requests k2. This can be achieved by applying known zero-knowledge techniques in the coin exchange process.

Various other changes and modifications may be made to the particular embodiments described above without departing from the scope of the invention. For example, it is assumed in the foregoing embodiments that the software licences in question are of unlimited duration, so that data tokens can be continually exchanged over an indefinite period. However, many types of licence may be employed in other embodiments, such as licences of limited duration whereby exchange of data tokens is limited to the duration of the licence, or licences for certain types of usage e.g. trial vs. professional use. In addition, use periods, and exchange periods where provided, may be defined in various difys. For example, use periods could be defined by an end time ($P_2$ above) only, and exchange periods by a start time ($Q_1$ above) only. However, the use of end times for exchange periods ($Q_2$ above) limits the need for the DRM server to store old data tokens for comparison. The provision of start times for use periods ($P_1$ above) offers flexibility in the setting of these times as desired for a given system. For example, these times may be set later than the actual exchange time to gain flexibility in the exchange without creating overlap in the use periods. As a further example, while not adding anything to security, software controllers could be identifiable to the DRM server in embodiments of the invention. Such embodiments still provide transferability and fraud protection for licences, though some of the privacy advantages are then lost. Also, for even greater privacy it may be desirable to prevent any uncontrolled flow of information from software controllers (and the back-up where provided) to the DRM server. This could be achieved using standard methods for wallets-with-observer architectures as exist in particular for coin systems.

The invention claimed is:

1. A software licence management system in which a licence to use a software product is represented by a data token, the system comprising:
   a computer processor;
   a software controller at a user device for controlling use of a software product at the user device wherein the software controller is adapted for:
   allowing said use of the software product at the user device only during a use period associated with a current data token representing the licence for the software product and supplied to the software controller by a licence management server, the licence management server communicating with the software controller via a data communications network;
   enabling user access to an exchange token, dependent on the current data token supplied by the licence management server, whereby the exchange token can be supplied as a current data token to another said software controller, and
   supplying one of the current data token and the exchange token via the network to the licence management server to be exchanged for a new data token to replace the current data token (a) to extend the licence for the software product beyond the use period associated with a current data token supplied by the licence management server and (b) if the current data token is an exchange token from another said software controller.

2. A system as claimed in claim 1 wherein the token identifier for a data token comprises that data token.

3. A system as claimed in claim 1 wherein the system is adapted such that the use periods associated with alternate data tokens in a chain of data tokens received by the software controller from the licence management server do not overlap.

4. A system as claimed in claim 1 wherein:
an exchange period is associated with each data token; and
the system is adapted such that a new data token, to replace a current data token, can be obtained by the software controller only during the exchange period associated with that current data token.

5. A system as claimed in claim 4 wherein the use period and exchange period associated with a data token overlap.

6. A system as claimed in claim 1 wherein the software controller is adapted for enabling user access to said exchange token by supplying the exchange token for storage by the user.

7. A system as claimed in claim 1 wherein the software controller is adapted for enabling user access to said exchange token by storing the exchange token at a back-up storage location and supplying access data, for accessing the exchange token at said storage location, to the user.

8. A system as claimed in claim 1 wherein the licence management server is adapted for supplying a new data token in exchange for a received token only if the received token does not correspond to a token already exchanged.

9. A system as claimed in claim 1 wherein the licence management server is adapted for supplying a new data token in exchange for a received token before detecting if the received token corresponds to a token already exchanged.

10. A system as claimed in claim 1 wherein the licence management server is adapted for:
receiving via the network from the software controller a new data token, to replace the current data token and having a new use period associated therewith, in exchange for a current data token, or an exchange token corresponding to the current data token,
detecting if a said token received from the software controller for exchange corresponds to a token already exchanged by the licence management server,
detecting if the same data token is received twice for exchange,
storing a token identifier corresponding to each data token received by the server for exchange, and
comparing the token identifier for each received data token with the stored token identifiers to detect if the same data token is received twice for exchange;
wherein the exchange token is a copy of the current data token.

11. A software licence management system in which a licence to use a software product is represented by a data token, the system comprising:
a computer processor;
a software controller at a user device for controlling use of a software product at the user device; and
a licence management server for communicating with the software controller via a data communications network;
wherein the software controller is adapted for
allowing said use of the software product only during a use period associated with a current data token supplied to the software controller by the licence management server,
receiving an exchange token associated with said licence, and
supplying one of the current data token and the exchange token via the network to the licence management server to be exchanged for a new data token (a) to extend the licence for the software product beyond the use period associated with a current data token supplied by the licence management server and (b) if a said exchange token is received by the software controller in the absence of a current data token;
and wherein the licence management server is adapted for
storing the use period for each data token supplied to the software controller under the licence, and
supplying via the network to the software controller a new data token in exchange for a current data token, or said exchange token, received from the software controller, the new data token having a new use period which does not overlap the use period of a data token previously-supplied under the licence, whereby the exchange token can be supplied as a current data token to another said software controller.

12. A system as claimed in claim 11 wherein a said data token comprises a coin.

13. A system as claimed in claim 11 wherein the use period associated with a data token is indicated in the data token.

14. A system as claimed in claim 11 wherein the software controller is adapted for supplying one of the current data token and the exchange token automatically to the licence management server to extend the licence for the software product.

15. A system as claimed in claim 11 wherein:
an exchange period is associated with each data token; and
the system is adapted such that a new data token, to replace a current data token, can be obtained by the software controller only during the exchange period associated with that current data token.

16. A system as claimed in claim 15 wherein the exchange period associated with a data token is indicated in the data token.

17. A system as claimed in claim 11 wherein:
a said data token represents a licence to use a plurality of software products; and
the software controller is adapted for storing product data, indicative of said plurality of software products, at a back-up storage location, and allowing use of each of the software products only during the use period associated with the current data token supplied by the licence management server.

18. A system as claimed in claim 17 wherein the product data comprises, for each software product, data representing an individual licence for that software product.

19. A system as claimed in claim 17 wherein the product data comprises the software products.

20. A computer processor including a software controller for use in a software licence management system in which a licence to use a software product is represented by a data token, the system having a licence management server for communicating with the software controller via a data communications network, wherein the software controller comprises control logic for controlling use of a software product at a user device, the control logic being adapted for:
allowing said use of the software product only during a use period associated with a current data token supplied to the software controller by the licence management server;
enabling user access to an exchange token, dependent on the current data token supplied by the licence management server, whereby the exchange token can be supplied as a current data token to another said software controller; and
supplying one of the current data token and the exchange token via the network to the licence management server to be exchanged for a new data token to replace the current data token (a) to extend the licence for the software product beyond the use period associated with a current data token supplied by the licence management server and (b) if the current data token is an exchange token from another said software controller;

wherein said use of the software product is not allowed if the current data token is an exchange token.

21. A licence management server for use with a software controller as claimed in claim 20 in a software licence management system in which a licence to use a software product is represented by a data token, the licence management server comprising control logic adapted for:
: communicating with the software controller via a data communications network;
: supplying via the network to the software controller a new data token, to replace the current data token and having a new use period associated therewith, in exchange for a current data token, or an exchange token corresponding to the current data token, received from the software controller; and
: detecting if a said token received from the software controller for exchange corresponds to a token already exchanged by the licence management server.

22. A computer program product stored on a non-transitory computer readable medium, comprising computer readable program means for causing a computer to perform a computer program for use in a licence management server of a software licence management system in which a licence to use a software product is represented by a data token, the system including a software controller as claimed in claim 20 and the licence management server being adapted for communicating with the software controller via a data communications network, wherein the computer program comprises program code means adapted to cause the licence management server to:
: supply via the network to the software controller a new data token, to replace the current data token and having a new use period associated therewith, in exchange for a current data token, or an exchange token corresponding to the current data token, received by the licence management server from the software controller; and
: detect if a said token received from the software controller for exchange corresponds to a token already exchanged by the licence management server; and wherein the exchange token can be supplied as a current data token to another said software controller.

23. A computer processor including a software controller for use in a software licence management system in which a licence to use a software product is represented by a data token, the system having a licence management server for communicating with the software controller via a data communications network, wherein the software controller comprises control logic for controlling use of a software product at a user device, the control logic being adapted for:
: allowing said use of the software product only during a use period associated with a current data token supplied to the software controller by the licence management server;
: receiving an exchange token associated with said licence; and
: supplying one of the current data token and the exchange token via the network to the licence management server to be exchanged for a new data token (a) to extend the licence for the software product beyond the use period associated with a current data token supplied by the licence management server and (b) if a said exchange token is received by the software controller in the absence of a current data token; and wherein the exchange token can be supplied as a current data token to another said software controller.

24. A licence management server for use with a software controller as claimed in claim 23 in a software licence management system in which a licence to use a software product is represented by a data token, the licence management server comprising control logic adapted for:
: communicating with the software controller via a data communications network; storing the use period for each data token supplied to the software controller under the licence; and
: supplying via the network to the software controller a new data token in exchange for a current data token, or said exchange token, received from the software controller, the new data token having a new use period which does not overlap the use period of a data token previously-supplied under the licence; and wherein the exchange token can be supplied as a current data token to another said software controller.

25. A computer program product stored on a non-transitory computer readable medium, comprising computer readable program means for causing a computer to perform a computer program for use in a licence management server of a software licence management system in which a licence to use a software product is represented by a data token, the system including a software controller as claimed in claim 23 and the licence management server being adapted for communicating with the software controller via a data communications network, wherein the computer program comprises program code means adapted to cause the licence management server to:
: store the use period for each data token supplied to the software controller under the licence; and
: supply via the network to the software controller a new data token in exchange for a current data token, or said exchange token, received by the licence management server from the software controller, the new data token having a new use period which does not overlap the use period of a data token previously-supplied under the licence; and wherein the exchange token can be supplied as a current data token to another said software controller.

26. A computer program product stored on a non-transitory computer readable medium, comprising computer readable program means for causing a computer to perform a computer program for controlling use of a software product at a user device in accordance with a licence represented by a data token, the user device being connectable to a licence management server via a data communications network, the computer program comprising program code means adapted to:
: allow use of the software product at the user device only during a use period associated with a current data token supplied to the user device by the licence management server;
: enable user access to an exchange token, dependent on the current data token supplied by the licence management server, whereby the exchange token can be supplied as a current data token to another said software controller; and
: supply one of the current data token and the exchange token via the network to the licence management server to be exchanged for a new data token to replace the current data token (a) to extend the licence for the software product beyond the use period associated with a current data token supplied by the licence management server and (b) if the current data token is an exchange token from another user device;
: wherein said use of the software product is not allowed if the current data token is an exchange token.

27. A computer program product stored on a non-transitory computer readable medium, comprising computer readable program means for causing a computer to perform a computer program for controlling use of a software product at a user device in accordance with a licence represented by a data token, the user device being connectable to a licence management server via a data communications network, the computer program comprising program code means adapted to:

allow use of the software product at the user device only during a use period associated with a current data token supplied to the user device by the licence management server;

receive an exchange token associated with said licence; and supply one of the current data token and the exchange token via the network to the licence management server to be exchanged for a new data token (a) to extend the licence for the software product beyond the use period associated with a current data token supplied by the licence management server and (b) if a said exchange token is received by the user device in the absence of a current data token; and wherein the exchange token can be supplied as a current data token to another said software controller.

28. A method for controlling use of a software product at a user device in accordance with a licence represented by a data token, the user device being connectable to a licence management server via a data communications network, wherein the method comprises, at the user device:

allowing use of the software product only during a use period associated with a current data token supplied to the user device by the licence management server;

enabling user access to an exchange token, dependent on the current data token supplied by the licence management server, whereby the exchange token can be supplied as a current data token to another said software controller; and supplying one of the current data token and the exchange token via the network to the licence management server to be exchanged for a new data token to replace the current data token (a) to extend the licence for the software product beyond the use period associated with a current data token supplied by the licence management server and (b) if the current data token is an exchange token from another user device;

wherein said use of the software product is not allowed if the current data token is an exchange token.

29. A method for operation of a licence management server of a software licence management system, in which system use of a software product at a user device is controlled by a method as claimed in claim 28, the method for operation of the licence management server comprising:

supplying via the network to the user device a new data token, to replace the current data token and having a new use period associated therewith, in exchange for a current data token, or an exchange token corresponding to the current data token, received from the user device; and detecting if a said token received from the user device for exchange corresponds to a token already exchanged by the licence management server.

30. A method for controlling use of a software product at a user device in accordance with a licence represented by a data token, the user device being connectable to a licence management server via a data communications network, wherein the method comprises, at the user device:

allowing by a computer processor use of the software product only during a use period associated with a current data token supplied to the user device by the licence management server; and supplying one of the current data token and an exchange token, associated with said licence, via the network to the licence management server to be exchanged for a new data token (a) to extend the licence for the software product beyond the use period associated with a current data token supplied by the licence management server and (b) if a said exchange token is received by the user device in the absence of a current data token; and wherein the exchange token can be supplied as a current data token to another said software controller.

31. A method for operation of a licence management server of a software licence management system, in which system use of a software product at a user device is controlled by a method as claimed in claim 30, the method for operation of the licence management server comprising:

storing the use period for each data token supplied to the user device under the licence; and supplying via the network to the user device a new data token in exchange for a current data token, or said exchange token, received from the user device, the new data token having a new use period which does not overlap the use period of a data token previously-supplied under the licence.

\* \* \* \* \*